Figure 4:
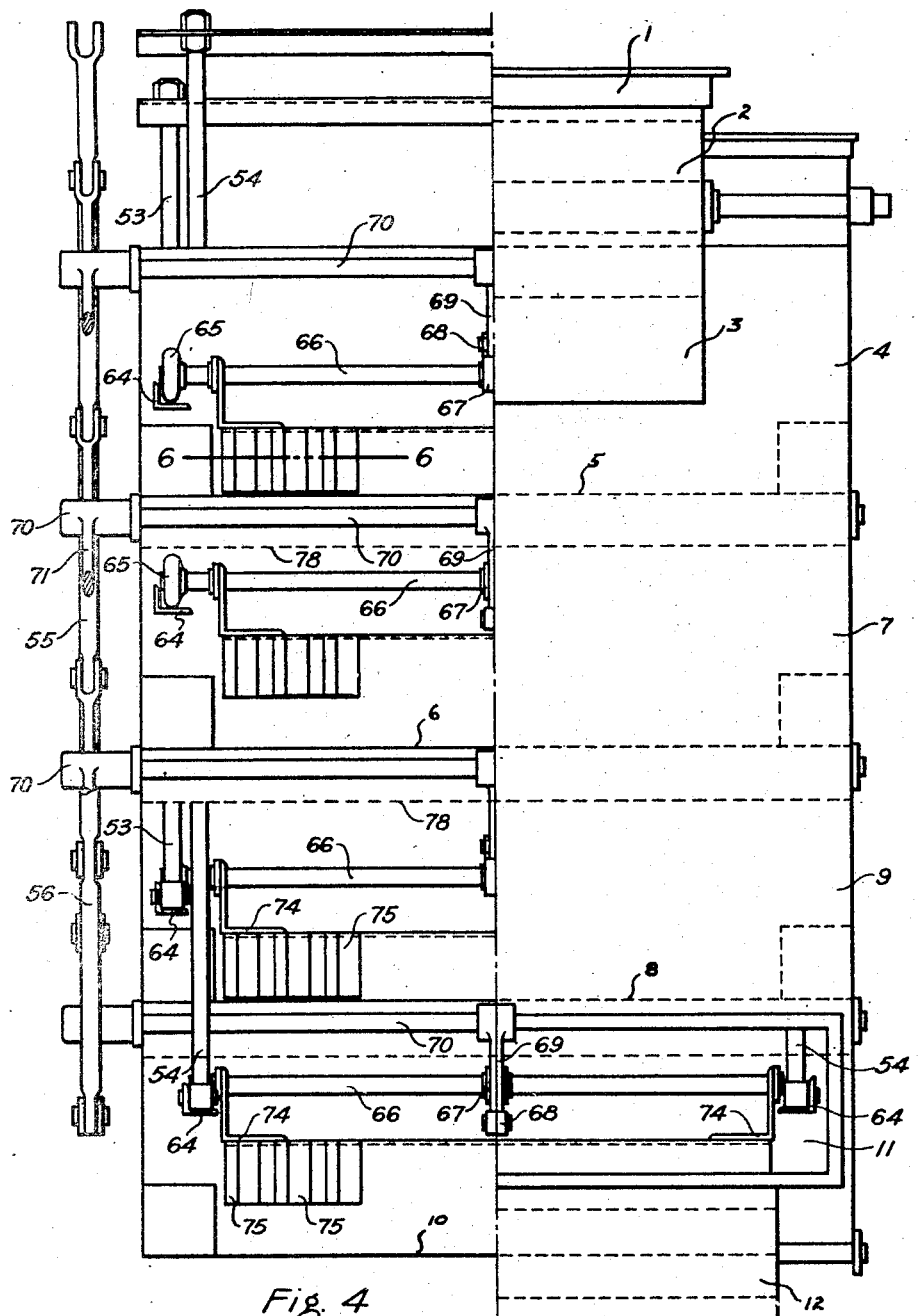

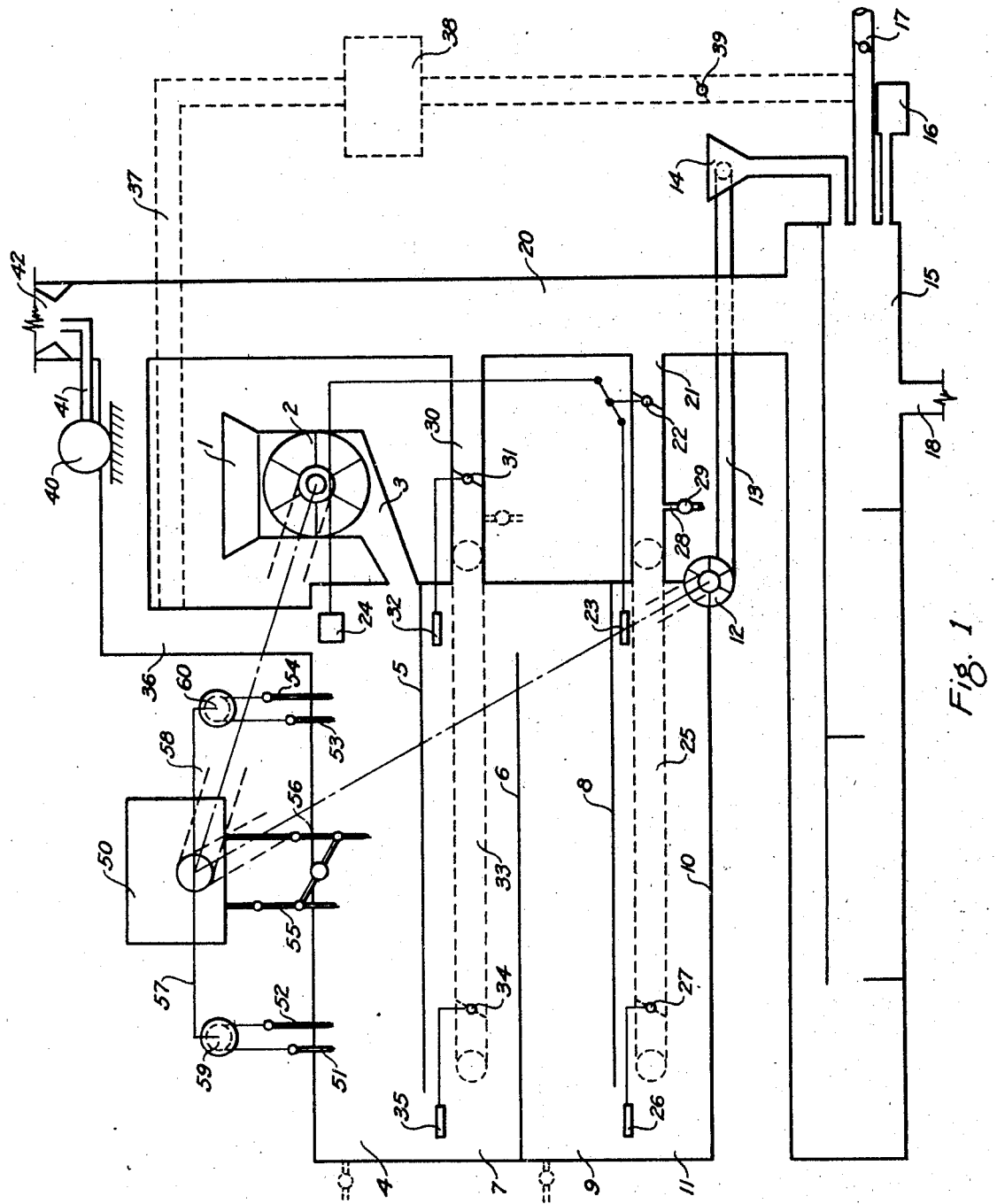

Nov. 26, 1940.  M. L. MILLER  2,223,117
METHOD OF DRYING MATERIALS
Filed April 19, 1937  4 Sheets-Sheet 2
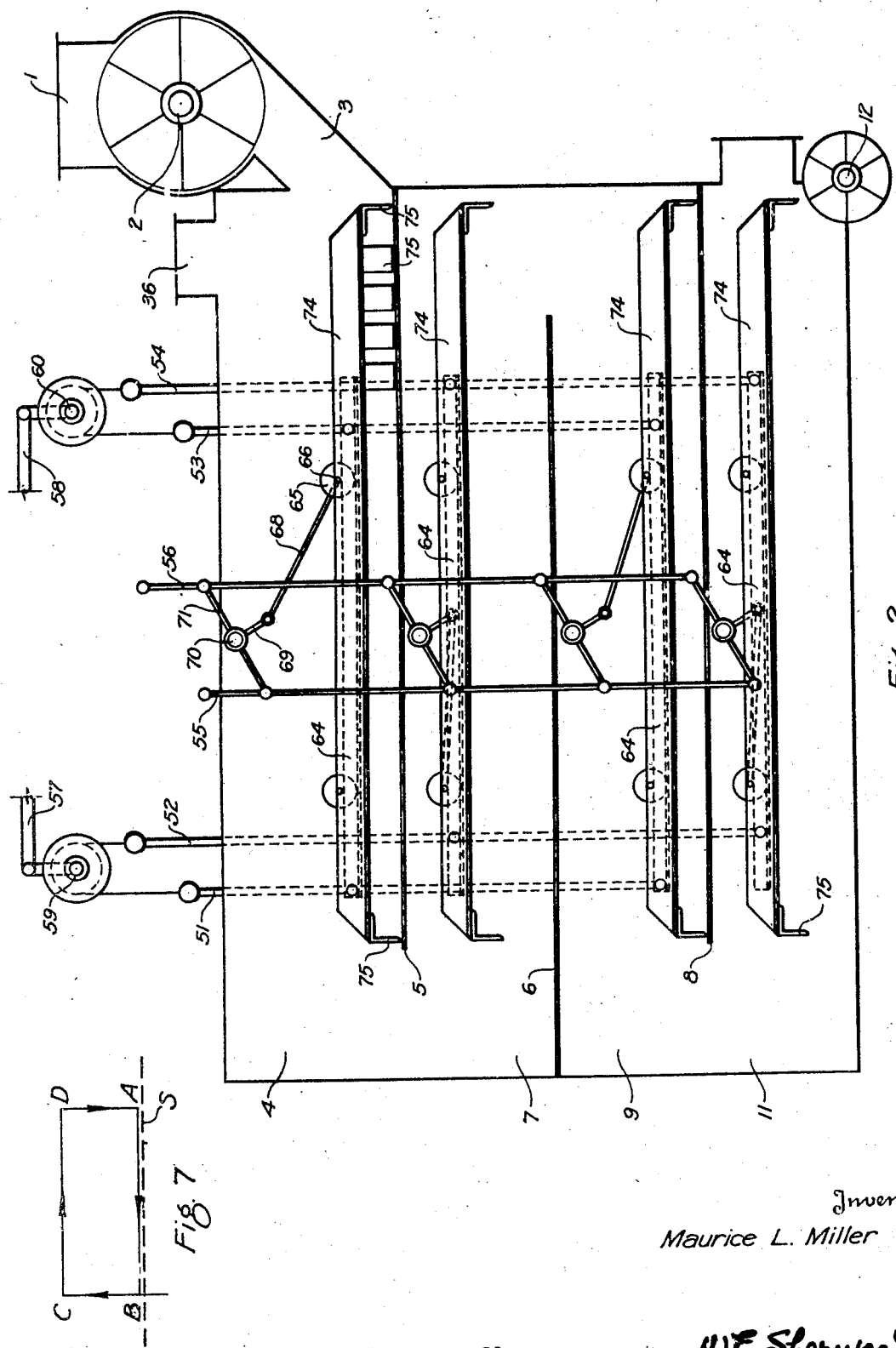
Inventor
Maurice L. Miller
By  W. E. Sherwood
Attorney Nov. 26, 1940.  M. L. MILLER  2,223,117
METHOD OF DRYING MATERIALS
Filed April 19, 1937   4 Sheets-Sheet 3
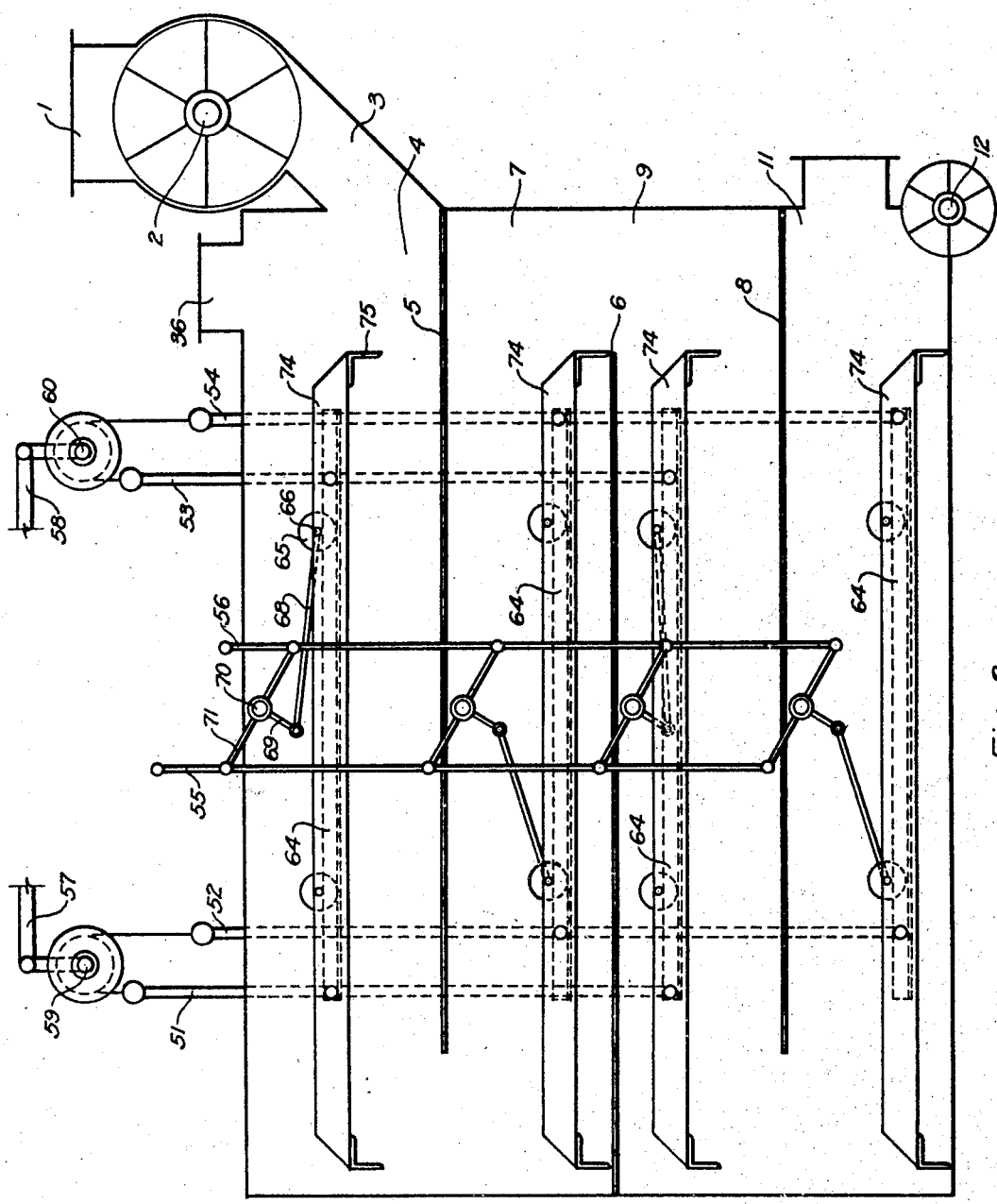
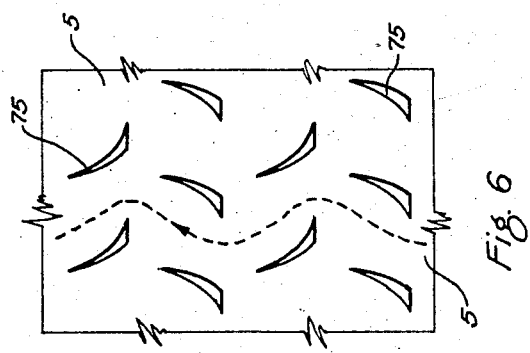
INVENTOR.
Maurice L. Miller
BY W. E. Sherwood
ATTORNEYS.

Nov. 26, 1940. M. L. MILLER 2,223,117
METHOD OF DRYING MATERIALS
Filed April 19, 1937 4 Sheets-Sheet 4

INVENTOR.
Maurice L. Miller
BY W. E. Sherwood
ATTORNEYS.

Patented Nov. 26, 1940

2,223,117

UNITED STATES PATENT OFFICE 2,223,117

METHOD OF DRYING MATERIALS

Maurice L. Miller, Louisville, Ky.

Application April 19, 1937, Serial No. 137,615

9 Claims. (Cl. 34—24)

This invention relates generally to the art of drying wet materials and in a more limited aspect to an improved method of drying materials having inherent characteristics which render conventional drying treatments inapplicable. For the purpose of fully disclosing the invention, the drying of sewage sludge preparatory to burning the same is taken as one example of its use. It is to be expressly understood, however, that the invention is limited in no way to that sole application but on the contrary may be used in the drying of many diversified types of organic and/or inorganic materials. In addition to teaching a method and means for efficiently drying materials heretofore considered difficult, the invention likewise provides a means for drying in a more satisfactory manner certain materials now being dried by other processes.

Despite the knowledge that sewage sludge has a high fuel value, it has been economically impractical heretofore to incinerate the same for disposal and to recover its fuel value for useful purposes, due to the lack of a suitable drying process. In general, the average sewage sludge resulting from a sedimentation, activated or chemical process will have a moisture-content of approximately 70–75%. Such a sludge consists of fats, carbohydrates, proteids, cellulose and inorganic materials and in certain instances may comprise as much as 75–85% of volatile matter. As a result, great caution must be exercised in the drying of the same in order to avoid scorching of this organic material with the consequential baking of the same upon the drying surfaces and the evolution of noxious odors carried by dust particles. Moreover, a uniform drying of the sludge without case hardening of the outer surfaces and without the formation of dust is required when such sludge is to be later delivered to an incinerator. In order to support combustion satisfactorily the sludge should be dried to a moisture-content of 20% or less and in order to avoid scorching or danger of flame in the drier itself the temperature of the drying medium must be limited to a value dependent upon the nature of the particular material being dried.

These characteristics of the material at once require a close and accurate regulation of the amount of sludge moving through the drier and the rate of travel of the same; of the volume, temperature and humidity of the heat transfer medium serving to dry the sludge; and of the heat transfer action and vapor pressure relation existing between the sludge and the heat transfer medium. Due to inherent limitations of structure, the conventional rotary drier, the stationary kiln drier and similar known drier constructions are unable to provide a satisfactory commercial drying process in accordance with these requirements.

Figure 5:
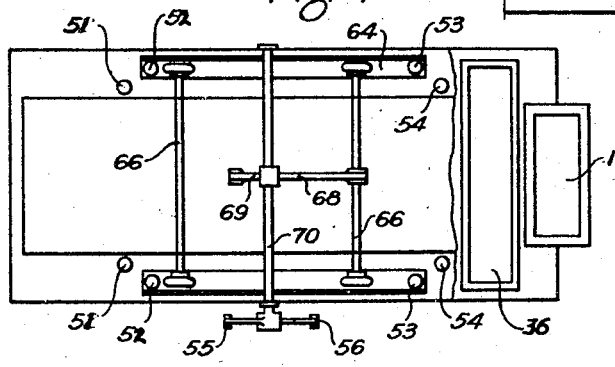

The present invention therefore has as a prime object the teaching of a new and improved process for drying wet materials, A second object is the provision of an improved method of controlling the movement of a wet material through a drying process, A third object is the provision of an improved method of controlling in a flexible and sensitive manner the heat exchange and vapor pressure reations between a heat transfer medium and a wet material in contact with the medium, A fourth object is the provision of an improved method of controlling the volume, humidity and temperature of a heat transfer medium in a drying process, Another object is the provision of an improved continuous process for rapidly and efficiently drying sewage sludge and similar materials, with or without subsequent incineration of the material, Other objects and advantages of the invention will become more apparent when considered in connection with the accompanying drawings in which, Figure 1 is a diagrammatic view illustrating one arrangement for carrying out the drying method hereinafter described, Figure 2 is a diagrammatic view partially in section showing the drying apparatus in one position of its operation, Figure 3 is a diagrammatic view partially in section showing the drying apparatus in another position of its operation, Figure 4 is an end elevation view of the apparatus partially in section showing certain interior operating elements and indicating the position of the elements corresponding to Figure 2, Figure 5 is a general plan view of the apparatus drawn to a smaller scale, Figure 6 is sectional view of one form of flight taken on line 6—6 of Figure 4 and Figure 7 is a schematic view illustrating the movement of the apparatus at various stages of operation.

One general arrangement for carrying out the process will be seen in Figure 1 wherein a wet material is introduced into hopper 1 and moved by means of a controlled regulating means 2 into a closed chute 3 entering the drying process. Assuming that sewage sludge, as an illustrative material, is being so handled, this sludge may contain as high as 70% or more of moisture and be in a spongy, sticky or plastic state. Immediately upon entering chamber 4 of the drier such sludge is spread in a layer of substantially uniform thickness upon the hot hearth 5 by means later to be shown and is brought into heat transfer relation with both the hearth surface and with a hot moisture-absorbing medium passing through the upper portion of chamber 4 preferably in counter current movement to the sludge movement.

After being so deposited upon the hot hearth and before any case hardening or charring of the sludge particles can take place the material is agitated by closely controlled mechanical means serving to change the particles of material in contact with the hot hearth below the material and the particles in contact with the hot medium above the material and simultaneously serving to move the entire layer of material slightly forward into a progressively hotter drying environment. Thus by successive steps with concurrent agitation the material approaches the exit of the initial drying chamber 4 whereupon it falls by gravity through an aperture in the hearth 5 and upon a hearth 6 in the drying chamber 7.

In like manner the material progresses successively along hearths 8 and 10 in the drying chambers 9 and 11 and is withdrawn in the desired dried condition by the controlled conveyor means 12.

In the event that incineration of all the material, such as sludge with its high fuel value is desired, the conveying means may move the material through a suitable conduit 13 into a hopper 14 leading into furnace 15. As is obvious, any portion of the dried material may be diverted to other uses and the furnace 15 may be fed with other fuel. One such instance would occur when grain recovered from distillery slop would be dried in the above process. For purposes of initially starting the process or for providing make-up heat an auxiliary fuel supply indicated generally at 16 is furnished. However, since incineration of dried sludge is desired not only for the high fuel value of the same but also because of its solution of the problem of disposition, it is contemplated that generally the entire output from conveyor 12 will be burned in furnace 15 whenever sewage sludge is the material being dried in accordance with this invention. In such case air serving both a combustion supporting function as well as forming an agent for carrying off moisture from the wet material may be admitted through inlet 17 leading to the furnace.

Ash disposal means 18 are provided for removal of the non-combustible elements of the sludge from the furnace. Since certain sludges may possess a fuel value as high as 9,000–10,000 B. t. u. per lb. it is evident that an extremely high temperature may obtain in furnace 15. If the entire volume of combustion gases from the furnace at this high temperature were brought into direct contact with sludge material being processed, the entire process of drying the sludge would be disrupted. However, when inorganic materials such as cement or the like are dried in the process such temperature may be conveniently utilized. The gases generated in furnace 15 therefore are led into exhaust stack 20 serving as a heat reservoir from which the requisite amount of hot drying gas may be drawn under close control. Obviously, the large amount of surplus highly heated gas from stack 20 may be used for any secondary useful purpose and such is therefore intended to be within the purview of my invention.

As described below the volume, temperature and humidity of the hot combustion gases brought into contact with the material to serve as a heat transfer and as moisture-absorbing agent must be closely controlled. Figure 1 indicates generally one arrangement for effecting such control. Hot gas for drying chambers 10, 11 and 9 is withdrawn from stack 20 through connection 21 controlled by a valve 22. For reasons later to become apparent, valve 22 in one satisfactory arrangement may be subject jointly to the control of thermostat 23 in drying chamber 11 adjacent the inlet of the hot gas and the exit of the dried material and to the control of humidostat 24 in drying chamber 4 adjacent the outlet of the gas from the drier and the inlet of the wet material into the drier. A certain portion of the gas admitted by valve 22 may be diverted through by-pass 25 and enter the end of chamber 11 adjacent the aperture into drying chamber 9. By means of a suitable thermostat 26 a valve 27 in the by-pass functions to control the admission of hot gas in dependence upon drying conditions at the exit end of chamber 9.

Similarly a connection 30 leading from stack 20 admits a regulated amount of gaseous medium into the drier under control of valve 31 acting under the influence of thermostat 32. A by-pass 33 conducts a portion of such medium under control of valve 34 acting under the influence of thermostat 35 and discharges the same adjacent the entrance into drying chamber 4.

In the event that the temperature of the smallest amount of hot gas required for drying purposes still would be too hot for the material being handled, provision is made for admitting atmospheric air or any other gas of suitable characteristics into the drier through inlet 28 controlled by valve 29. If desired, similar inlets for any desired drying mediums may be provided for each or all of the separate drying chambers and be controlled by any conventional regulating means without departing from the scope of the invention. As will be obvious, the precise location and number of thermostats and humidostats within the drying chambers may be changed in accordance with the flexibility and sensitivity of the degree of control desired. Other conventional control equipment such as pressure responsive means, velocity responsive means and the like may also be employed. This fact that the process and structure herein shown is thus adaptable to the use of such control equipment forms an important distinction of my invention over the other types of drying equipment above mentioned.

By means of such an arrangement a controlled amount of gaseous medium passes through the drier and is enabled to contact both the upper surface of the layer of material moving along the hearths and also contact and heat the under side of the hearth structure. The relatively cool moisture laden medium then leaves the drier through outlet 36 and is re-directed into the exhaust stack 20. In certain circumstances it may be desirable to recycle a portion or all of such medium and as shown in dotted lines such medium may be led through a conduit 37 and dehumidifier 38 entering the furnace under control of valve 39. Although a forced draft may be employed for furnace 15 when desired, it has been found advantageous to use an induced draft arrangement one form of which is diagrammatically illustrated comprising a fan 40 forcing a separate air stream through conduit 41 into nozzle 42 and thus providing an induced draft both through the drier and upon the furnace.

Referring now to Figures 2 and 3 the drier construction is diagrammatically shown. Mounted at any convenient location above said drier (Figure 1) is an improved mechanical movement generally indicated at 50 and serving to actuate the duplicate rods 51, 52, 53 and 54, at each side of the drier as well as the central rods 55 and 56 in timed sequence as will more fully appear as the description proceeds. Likewise movement 50 preferably actuates means 2 and conveyor 12 in a timed and controlled manner in order to provide for an exact intake of wet material and exact output of dried material. For convenience this relationship of the action of the drier mechanism with the movement of the material is hereinafter described as "a controlled throughput."

Extending from movement 50 are two synchronized shafts 57 and 58 connected by bell cranks to pulley members 59 and 60 to which the rods 51, 52, 53 and 54 are respectively engaged. These rods serve the purpose of alternately raising and lowering the flight assembly contained within the drier. In order to provide for balanced loads rods 51 and 53 are attached to certain of the same flight sections while rods 52 and 54 are attached to the other flight sections.

Operatively mounted in each of the drying chambers 4, 7, 9 and 11 are similar flight sections symmetrically mounted upon channel members 64 at each side of the drier as best shown in Figure 4. These members are rigidly affixed at each end to lifting and lowering rods 51, 52, 53 and 54 and are so arranged that when channel members 64 in chambers 4 and 9 are being raised, the channel members in chambers 7 and 11 are being lowered. Channels 64 which carry the flight mechanism are adapted to move only in a vertical plane.

For longitudinal movement of the flight sections providing for movement of the material each flight section is adapted to move along the channel members 64 upon rollers 65. Although rollers are shown herein it is obvious that sliding means or other suitable mechanism may be provided when desired. For example, it is contemplated that upon certain occasions channel members 64 may be mounted in an inclined position and that the hearths may be likewise inclined toward the discharge terminus of each chamber, whereupon the flight sections could slide by gravity while moving the load of material and rollers 65 could thus be supplanted by other bearing means.

In the showing illustrated herewith rollers 65 are mounted upon shafts 66 loosely journalled adjacent their centers within a housing 67 to which is attached a rod 68 connected at its opposite end to a bell crank 69. This bell crank is rigidly journalled upon a rock shaft 70 extending thru the sides of the drier housing. A cross rod 71 forming an integral part of the bell crank and rigidly journalled upon rock shaft 70 is connected at each end to the reciprocable rods 55 and 56 actuated in time sequence by movement 50. When rod 55 is lowered and rod 53 is simultaneously raised the rock shaft through the thus described mechanical linkage actuates the rods 68 and pushes or pulls the entire flight section along channels 64.

For convenience, the linkage is so connected that the movement of the loaded flight assembly is actuated during the pulling motion of the arms 68, while the movement of the unloaded assembly is actuated during the pushing motion of the arms 68. Moreover, for purposes of balancing the loads all flight sections move in unison; the flight sections in chambers 4 and 9 carrying a load of material in one direction while the sections in chambers 7 and 11 move in the same direction without a load of material. Similarly when the sections in chambers 7 and 11 move in one direction carrying a load of material the sections in chambers 4 and 9 move in the same direction without a load of material.

Depending from shafts 66 by means of detachable bracket members 74 is a structure generally termed "flight section" best shown in the lower part of Figure 4. This structure may comprise a series of suitably mounted plow shaped members 75 extending transversely of the drier as shown in section in Figure 6, and having depending plows extending into close proximity to the hearth surface when the flight section is in lowered position. These transverse rows of plow members extend the entire length of the flight sections as indicated in Figure 2. They preferably are mounted in such a way as to provide a maximum of open space above each plow member providing for a maximum contact with the drying medium passing above the layer of material moved by the plows. Numerous arrangements and modifications of design of these plow members may readily be made without departing from my invention, but I prefer to stagger the plows in adjacent rows and reverse the plowing surfaces so that the material moved thereby will pass through a tortuous course as indicated by the heavy dotted lines in Figure 6 while at the same time retaining the general form of a layer of substantially constant thickness.

In order to move the material efficiently along the hearth surfaces without possibility of caking, the hearth may consist of a channel construction having sides against which the edges of the outermost plow members 75 move with a close fit. This construction moreover provides for heating three sides of the mass of wet material thru conduction of heat thru the hearth and for heating of the fourth or top side of the material thru direct contact with the hot gases.

It will be noted that this type of drier construction lends itself admirably to use by heating with a jacket of steam or other separate medium and in order to make use of this type of heating the drier may be so converted merely by constructing a false bottom 78 (indicated in dotted lines in Figure 4) and then connecting the several resulting jackets to a steam line in any conventional manner.

By means of the construction thus shown the following method of operation constituting the essential part of the present invention may result. As shown schematically in Figure 7, each flight section of the drier follows a four step movement in sequence. Beginning at point A, exemplified by the position of the flight section in chamber 4 in Figure 2, the flight moves to point B dragging and agitating the material along the hearth S. At point B the flight is raised from the material and travels upwardly to point C, indicated by the flight position in chamber 4 of Figure 3. Here the flight is moved back without load to point D after which it is again dropped to point A.

During this sequence of operations the following significant drying operation is taking place. As sludge is introduced upon hearth 5 of chamber 4 through chute 3 it receives its first heat through conduction from the hearth material heated by gases in chamber 7. The gases passing above the sludge and out through passage 36 are relatively cool and are laden with moisture. Immediately after a mass of sludge is introduced mechanism 50 through rods 51 and 52 lower the flight section upon the sludge mass and forms a sludge layer of substantially uniform thickness.

In moving downward plows 75 separate the sludge into separate portions. As the lower edge of the plows approach the surface of hearth 5 movement 50 through rods 55 and 56 start moving the flight section to the left. During this movement the sludge is plowed over and over and receives heat not only from contact with the hearth 5 and side walls thereof through conduction, but also by contact with the gases above the sludge layer. However, during this plowing motion the average thickness of the sludge layer remains substantially uniform. It will be noted that the open space above the plows 75 permits an intimate contact of gas and material and a transfer of heat by connection. To some degree also a heat transfer by radiation is also taking place.

As the flight section continues to move, the material is plowed back and forth meanwhile being constantly advanced to the left into a progressively hotter drying region. Moisture contained in the material is constantly being evaporated from its surface by the drying medium and being carried away thereby. This evaporation is uniformly controlled due to the agitation of the sludge particles and no one portion of the sludge is dried to a greater extent than a neighboring portion.

As the flight section moves to its extreme left it begins to lift from the material and leaves the same temporarily stationary until the flights have travelled backward and engaged another mass of sludge delivered by the controlled means 2 during the thus described movement of the flights. Upon engaging the new sludge mass a more advanced group of plows 75 engage the first sludge mass and advance it as before toward the aperture in the hearth 5. During the temporary retention period upon the hot hearth the sludge having lost a portion of its moisture tends to settle into a more compact mass and tends to fill voids between adjacent portions of the mass. A measure of heat is being applied to the same at the same time and evaporation from and diffusion of moisture in the sludge is simultaneously occurring.

Before the sludge has time to bake upon the hearth surfaces or to case-harden upon the outer surface of the particles, plows 75 have again descended upon the mass with a slicing action dividing the mass once more into separated portions. As the plows continue to move, the sludge in contact with hearth 5 and its walls is scraped therefrom and mixed intimately with interior portions of the partially dried mass. This action continues intermittently until the sludge falls through aperture in hearth 5 after which the same action takes place successively in drying chambers 7, 9 and 11. During this movement through the successive chambers the material passes from its drying at constant rate stage down to a drying at a falling rate stage and eventually is delivered into conveyor 12 with a moisture content beyond which it is unnecessary or else is economically impractical to go. In the average sewage sludge intended for prompt incineration this value may be approximately 20%. In other materials this value may be higher or lower, but in any event will probably not be lower than the moisture content of the environment in which the material is to be stored or used.

It is thought that one advantage possessed by the above process over known processes resides in the ability to effect an accurately controlled diffusion of moisture from the interior of the material to the surface of the material during the heat application stages. Most wet materials contain entrapped vapors which must be released to the surface before a uniformly dried material can be achieved. As soon as the drying at the constant rate period is completed means must be provided for reducing the average distance from the interior of the material to the exposed surface thereof so that these entrapped vapors may be released during the falling rate period. Otherwise the portions of the material will dry sooner than the inner portions and case-hardening will result.

In the process thus disclosed the slicing, rolling and agitating action of plows 75 continues during the entire passage of the material through the drier. When the drying at constant rate is completed, for example possibly somewhere in chamber 7, the diffusion of moisture from the interior of the sludge particles to the exterior surface thereof is accelerated by the slicing action of plows 75 in dropping upon, pushing through and lifting from the layer of sludge. Then while the thus agitated layer temporarily rests upon the hot hearth with the hot medium sweeping across the exposed upper layer of sludge the entrapped vapors are released and carried away by the moving stream of medium. Since the plows of the flight sections are then above the layer an intimate and direct contact of the hot air stream with the surface of the material is possible. This action, so far as is known, is impossible of accomplishment in rotary driers even when using sharp projections or the like within the drier casing.

By virtue of the sensitive and flexible control of drying medium coupled with the automatic controlled throughput of material no appreciable amount of dust resulting from excessively dried material can result. Since the material is not scorched or burned and since no dust to serve as a carrier of odors is present it follows that the process is remarkably free of this long present disadvantage of sewage driers.

Furthermore, this same controlled drying results in a final product which is not discolored. In certain applications as in drying alfalfa, as being illustrative of organic material or marble dust as being illustrative of inorganic material, this feature may prove of prime importance.

Having thus described the invention, I claim:
1. The method of uniformly drying a plastic-like material, including forming the material into a layer of substantially uniform thickness, moving the material through a drying zone while maintaining the uniform thickness of layer and simultaneously cutting through the entire depth of the layer of the material in order to release entrapped vapors from within the mass of plastic, partially dried material, passing a moisture-absorbing heated gas through the drying zone countercurrent to the movement of material and in direct contact therewith in order to carry away moisture and vapors liberated from the drying material and to transfer heat to the material and regulating the quantity of such gas contacting the material in its driest condition in dependence upon both the temperature of the gas contacting the material in its driest condition and the moisture content of the gas contacting the material in its wettest condition.

2. The method of uniformly drying a wet material including, forming the material into a layer of predetermined depth at which optimum drying results, advancing the layer of material through a drying zone by intermittent positive movements during which entrapped vapors are released from the material succeeded by periods of rest, agitating the entire depth of layer during the positive movements and continuously maintaining the predetermined depth of layer during both the periods of movement and rest, passing a moisture-absorbing heated gas through the drying zone countercurrent to the movement of material and in direct contact therewith in order to carry away moisture and vapors liberated from the drying material and to transfer heat to the material and regulating the quantity of such gas contacting the material in its driest condition in dependence upon both the temperature of the gas contacting the material in its driest condition and the moisture content of the gas contacting the material in its wettest condition.

3. The method of uniformly drying a material continuously, including forming the material into a layer of substantially uniform thickness, moving the material through a drying zone while maintaining the uniform thickness of layer at all times during said movement, continuously controlling the input and output of material through the drying zone in accordance with the rate of movement of said material and simultaneously agitating the entire depth of layer of the material in order to release entrapped vapors from the interior of the layer of material, passing a moisture-absorbing heated gas through the drying zone countercurrent to the movement of material and in direct contact therewith in order to carry away moisture and vapors liberated from the drying material and to transfer heat to the material and regulating the quantity of such gas contacting the material in its driest condition in dependence upon both the temperature of the gas contacting the material in its driest condition and the moisture content of the gas contacting the material in its wettest condition.

4. The method of uniformly drying a plastic-like material, including forming the material into a layer of substantially uniform thickness, positively moving the material along a heat exchange surface while maintaining the uniform thickness of layer, and simultaneously agitating the entire depth of layer and changing the contact surfaces of the material with the heat exchange surface without varying the uniform thickness of layer in order to provide uniform drying without caking on said surfaces or entrapment of vapors within the dried material, passing a moisture absorbing heated gas through the drying zone countercurrent to the movement of material and in direct contact therewith and with the heat exchange surface in order to carry away moisture and vapors liberated from the drying material and to transfer heat to the material and regulating the quantity of such gas contacting the material in its driest condition in dependence upon both the temperature of the gas contacting the material in its driest condition and the moisture content of the gas contacting the material in its wettest condition.

5. The method of uniformly drying a plastic-like material, including forming the material into a layer of substantially uniform thickness, positively moving the material through a drying zone, simultaneously agitating the entire depth of said layer of material while maintaining the uniform thickness of layer whereby the material may be dried uniformly and the entrapped vapors released by the agitation may be absorbed by the heat transfer medium, passing a moisture-absorbing heated gas through the drying zone countercurrent to the movement of material and in direct contact therewith in order to carry away moisture and vapors liberated from the drying material and to transfer heat to the material and regulating the quantity of such gas contacting the material in its driest condition in dependence upon both the temperature of the gas contacting the material in its driest condition and the moisture content of the gas contacting the material in its wettest condition.

6. The method of drying a material uniformly under a close and flexible control comprising, positively moving a material in the form of a uniform layer through an elongated drying zone, positively controlling the intake and delivery of material through the process in dependence upon the movement of material through the zone, agitating the entire depth of layer without variation in uniformity of depth, introducing a drying medium into the zone in contact with the material at a plurality of separated points and regulating the quantity of such medium contacting the material in its driest condition in dependence upon both the temperature of the gas contacting the material in its driest condition and the moisture content of the gas contacting the material in its wettest condition.

7. The method of drying a wet material whose rate of moisture-diffusion to its exposed surfaces will result in a case-hardening or caking of the material when subjected to an improper application of heat including, positively moving said material through a drying zone of regulated drying capacity in the form of a layer having a constantly maintained, substantially uniform thickness greater than the thickness at which burning begins and less than the thickness at which insufficient drying results, whereby diffusion of the entrapped moisture will continuously take place on the exposed surfaces of the material, maintaining said regulated layer at all times while in the drying zone by simultaneously controlling the input and rate of travel of material through said zone, and agitating the layer of material during its travel through said zone in order to remove the diffused moisture uniformly from the exposed surfaces thereof and to produce a uniformly dried material without caking or case-hardening, passing a moisture-absorbing heated gas through the drying zone countercurrent to the movement of material and in direct contact therewith in order to carry away moisture and vapors liberated from the drying material and to transfer heat to the material and regulating the quantity of such gas contacting the material in its driest condition in dependence upon both the temperature of the gas contacting the material in its driest condition and the moisture content of the gas contacting the material in its wettest condition.

8. In the method of drying a material whose rate of moisture-diffusion to its exposed surfaces will result in a case-hardening or caking of the material upon improper application of heat, the step of positively moving said material through a drying zone of regulated drying capacity in the form of a layer having a constantly maintained, substantially uniform thickness greater than the thickness at which burning begins and less than the thickness at which insufficient drying results, whereby diffusion of moisture will continuously take place from the material, agitating said material while maintaining said uniform thickness of layer and drying said material by removal of the released, entrapped moisture thus diffused to the exposed surfaces, passing a moisture-absorbing heated gas through the drying zone countercurrent to the movement of material and in direct contact therewith in order to carry away moisture and vapors liberated from the drying material and to transfer heat to the material and regulating the quantity of such gas contacting the material in its driest condition in dependence upon both the temperature of the gas contacting the material in its driest condition and the moisture content of the gas contacting the material in its wettest condition.

9. The method of uniformly drying a plastic-like material including, forming the material into a layer of substantially uniform thickness, moving the material through a series of communicating drying compartments of progressively hotter temperature, maintaining the uniformity of layer of the material while moving through each drying compartment and simultaneously agitating the entire depth of the layer of material in order to release entrapped vapors uniformly as the material moves through the hot drying compartments passing a moisture-absorbing heated gas through the drying zone countercurrent to the movement of material and in direct contact therewith in order to carry away moisture and vapors liberated from the drying material and to transfer heat to the material and regulating the quantity of such gas contacting the material in its driest condition in dependence upon both the temperature of the gas contacting the material in its driest condition and the moisture content of the gas contacting the material in its wettest condition.

MAURICE L. MILLER.